(12) United States Patent
Hovey

(10) Patent No.: US 10,799,788 B2
(45) Date of Patent: Oct. 13, 2020

(54) ELECTRONIC GAME BOARD

(71) Applicant: Brian Hovey, Stewartville, MN (US)

(72) Inventor: Brian Hovey, Stewartville, MN (US)

(*) Notice: Subject to any disclaimer, the term of this patent is extended or adjusted under 35 U.S.C. 154(b) by 0 days.

(21) Appl. No.: 16/292,510

(22) Filed: Mar. 5, 2019

(65) Prior Publication Data

US 2020/0282307 A1    Sep. 10, 2020

(51) Int. Cl.
*A63F 13/2145* (2014.01)
*G06F 3/041* (2006.01)
*G06F 3/0488* (2013.01)
*A63F 3/00* (2006.01)

(52) U.S. Cl.
CPC ...... *A63F 13/2145* (2014.09); *A63F 3/00643* (2013.01); *G06F 3/0416* (2013.01); *G06F 3/0488* (2013.01)

(58) Field of Classification Search
CPC ........................................................ G07F 17/32
See application file for complete search history.

(56) References Cited

U.S. PATENT DOCUMENTS

| | | | | |
|---|---|---|---|---|
| 2010/0113148 A1* | 5/2010 | Haltovsky | ............... | A63F 13/26 463/30 |
| 2011/0069019 A1* | 3/2011 | Carpendale | ......... | G06F 3/04883 345/173 |
| 2011/0169748 A1* | 7/2011 | Tse | ........................ | G06F 3/0425 345/173 |

* cited by examiner

*Primary Examiner* — Reginald A Renwick
(74) *Attorney, Agent, or Firm* — Jerry D Haynes; Law Office of Jerry D Haynes

(57) ABSTRACT

An electronic table top game board that includes: an interface area, where the interface area adapts to a predetermined configuration based on user input; player informational displays surrounding the interface area; and a plurality of user interactive devices. The interface area and the plurality of user interactive devices preferably include touch interactive protocol. The electronic table top game board may also include an alternative controller, where the alternative controller includes a joystick and a plurality of control buttons.

10 Claims, 1 Drawing Sheet

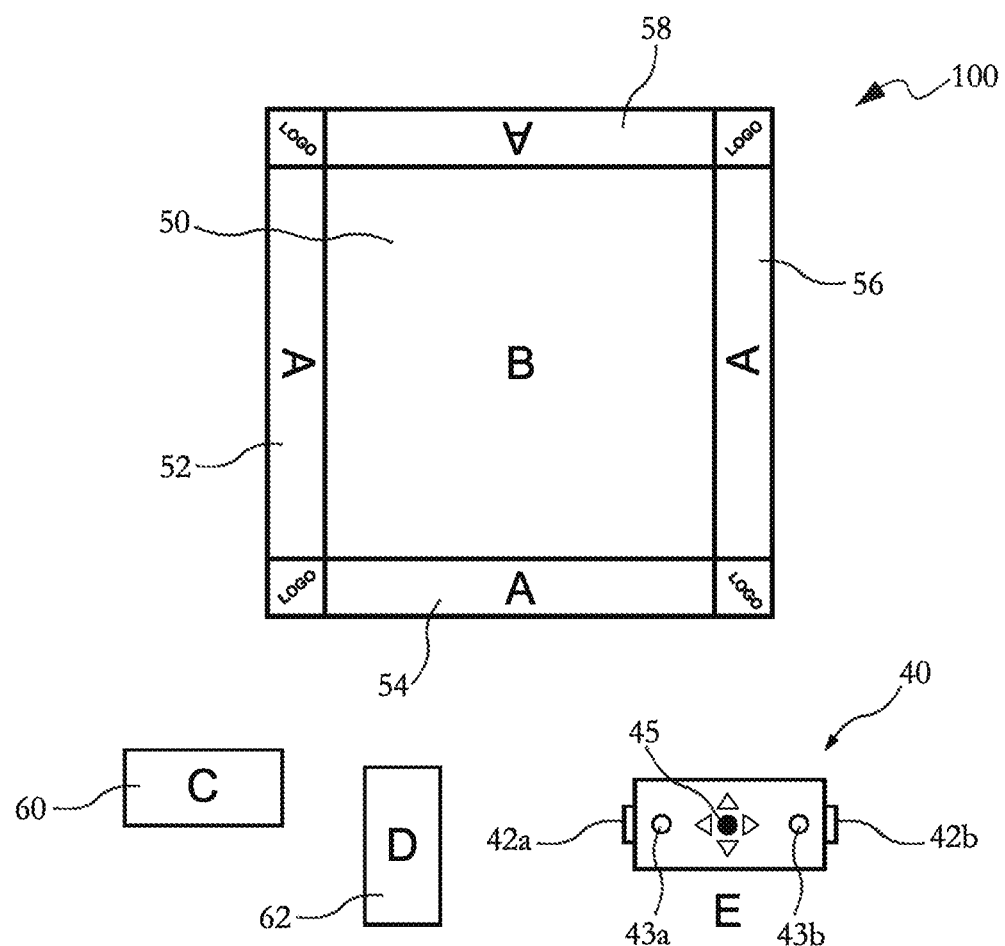

ELECTRONIC GAME BOARD

BACKGROUND OF THE INVENTION

Field of Invention

The present invention relates to an electronic table top game board that may be used to play a plurality of traditional board games.

Description of Related Art

Electronic game boards are usually in a format used on a computer screen, a tablet or a hand held electronic device. These game boards essentially interface through the traditional computer format with an input device such as a mouse, joystick or electronic touch screen. However, the use of such an electronic game board is not appealing to some individuals who may enjoy traditional game boards in a table top format. A traditional game board unfolds and lays on the table top and usually has tokens or other interactive aspects such as dice that are used to determine move count. However, the drawback to the traditional game board is the maintenance required and the importance of maintaining all the pieces, cards or other assorted components of the game board. As a result, it would be advantageous to have an electronic table top game board that enables users to engage in the traditional gaming activity over an electronic surface. One advantage to the electronic game board is the ability to engage with the various types of games.

SUMMARY OF THE INVENTION

The present invention relates to an electronic table top game board that includes: an interface area, where the interface area adapts to a predetermined configuration based on user input; player informational displays surrounding the interface area; and a plurality of user interactive devices. The interface area and the plurality of user interactive devices preferably include touch interactive protocol. The electronic table top game board may also include an alternative controller, where the alternative controller includes a joystick and a plurality of control buttons.

BRIEF DESCRIPTION OF DRAWINGS

FIG. 1 depicts an electronic game board with the accessories in accordance with the present invention.

DETAILED DESCRIPTION

The present invention relates to a table top electronic game board that is capable of interfacing and engaging in various games based upon input by the user. Rules and game board layout may be integrated into the electronic game board according to the present invention by using software that simulates a traditional game board format. The electronic game board according to the present invention may be implemented to partake in traditional game boards such as any card game, dice, board games, puzzles, arcade games, fantasy football, TV game shows, 3D and holographic games. As a result, a multitude of games may be implemented through the electronic game board without the need for storage of multiple boards and pieces that are associated with a traditional game board. The present electronic game board is engaged on a table top that gives a familiar set up for the users.

The electronic game board may be set up based upon user preferences such as: how they shuffle cards by either letting it be a computer generated shuffle or by cards continually shuffling until player hits the "deal" button, stopping the shuffle and cards dealt, making it as if player was shuffling cards and deal was selected as random as a real shuffle of a deck of cards. The same with the shake of the dice or selecting tiles as with Dominos or Scrabble, tiles on area of the electronic game board display screen face down, player can chose the random computer pic or touch the tiles displayed to make their choice. When playing games like Scrabble where it's beneficial to have game boards facing you, on the display on electronic game board is capable of rotating to face next player and all options of play will be set up by players.

The scoring displays can be on both the electronic game board and on each player's hand held device, again players will decide which they want. A hand held device is used when players need to keep cards, tiles, game pieces hidden from other players, a hand held device may be adapted for use with the electronic game board or separately, players may also use their smartphone or iPad as their hand held device. Not only can players link their phone or tablet to the electronic game board but each electronic game board will be able to link to each other via a communications network, so even if out of state, two or more electronic game boards can link to each other to allow players to play the same game. In another way electronic game board may link to each other for tournament style games, for large family get togethers, events, fund raising, for any reason. Again players will set up the tournament rules, time limits, play for each tournament as they want and the electronic game board does the rest, such as keeping scores, time, breaks, and moves players around when called for. The electronic game board also lets you pause any game and resume later, can keep tract of statistics for all players.

The electronic game board can also be used for educational purposes, with the larger screen, touch screen feature, hand held devices will make it beneficial for at home schooling as well as in schools. A user may also adjust the electronic game board from a flat position on a surface to adjust screen to an angle for arcade style games or a better view for educational purposes. The electronic game board has all features needed for whatever game or puzzle you want to play, how you play, how you score, how you display or how you view. A user may also use an electronic pen to draw on the electronic game board, just as you can now draw and create on your personal devices, the screen of the electronic game board will allow you to split screen for more than one person to use to draw, color and create on, their pens only working on their side or all areas, again allowing users of the electronic game board to decide how they want to use it.

In reference to FIG. 1, an Electronic Game Board 100 is depicted. The Game Board 100 has an electronic Interface Area 50. The Interface Area 50 may be configured electronically through the implementation of appropriate software and provide a display of a traditional game board. The Interface Area 50 is depicted at the center of the Game Board 100, where four player displays 52, 54, 56, 58 surround the Interface Area 50, so a plurality of players may play on the Game Board 100 in accordance with the present invention. The player displays 52, 54, 56, 58 may include statistical information and specific game information while engaging in that game across the Interface Area 50. This statistical information may include token designation, percentage or amount of money available to a player, or chips available to a player, the display areas are controlled electronically through software provided within the Board 100. In one embodiment, the Game Board 100 may include additional ports to allow connectivity of multiple players on each side of the board. Further, the game boards may be linked or connected to one or more game boards, allowing even more players to interact and engage in a board game. The Game Board 100 may be portable or custom to fit in a table or other furniture.

The present invention includes an ability to configure the Interface Area 50 into a game board based upon input provided by software. In particular, the Interface Area may provide a digital display of various traditional game boards such as Chess, Monopoly, Scrabble, Clue, Risk, Yahtzee, Sorry, Game of Life, Trouble, Mastermind, Checkers, Chinese Checkers, Connect 4, Backgammon or a Trivial Pursuit, to name a few. Further card games may also be played such as any traditional card game with a four suits per deck such as poker, gin rummy, blackjack, solitaire, spades, bridge, or Pai Gow, to name a few. The cards may be dealt using the interactive handheld devices and shuffling of the deck will be integrated within the Interface Area 50. In terms of shuffling, the shuffle may be a random shuffle that is initiated by a dealer through the touch screen of the Interface Area 50 or randomly shuffled by computer generated.

Interactive Devices 60, 62 are hand held devices that in all are used to engage in and interact with the Game Board 50. In the preferred embodiment the hand held devices relates to use of a smartphone. As such the smartphone includes appropriate software for interactive play with and between users. An alternative Controller 40 is shown also in FIG. 1. The Controller 40 includes a joystick 45, a pair of knobs 40*a*, 40*b* and buttons 42*a*, 42*b* on side panels of the Controller 40. These particular items shown on Controller 40 allow interactive activity with an electronic game played on the Game Board 50. The controls also include knobs 43*a*, 43*b* and provide additional interactive sources. Another aspect of the Interface Area 50, the screen may be configured into an arcade game using the Controller 40. Such arcade games include Pacman, Street Fighter, Donkey Kong, Galaga, Candy Crush, Mine Sweeper and/or numerous other conventional arcade games.

The game board according to the present invention also may be connected wirelessly to the internet in order to download various software for play on the game board. Further aspects include a touch screen capability on the Interface Area 50 and Interactive devices 60, 62 shown in FIG. 1. As an alternative to the Interactive devices 60, 62, an individual may engage with the board and board game through a smart phone, which includes an application associated with the Game Board 100. Overall the game board provides a table top alternative for electronic gaming to replace the traditional game board of the prior art.

The Interface Area 50 may be displayed in 3D or holographic format depending on the game being played over the Interface Area 50. The Interface Area 50 may be used to play crossword puzzles, doodle, or even drawing. Also the Interface Area 50 may be configured for use of an Etch A Sketch configuration. As stated, the Interface Area 50 and game board 100 functions on a table top may also include a wireless connection to access software and interactive play with players via an internet connection. As such, the present invention provides a dynamic and complete game board for user consumption. Further numerous educational games may be implemented over the interactive area.

The Gameboard 50 may be set with various parameters based upon users preference, for example, users may shuffle cards by either using a computer generated shuffle or by cards continually shuffling until player hits the "deal" button, stopping the shuffle and cards dealt, making it as if player was shuffling cards and deal was selected as random as a real shuffle of a deck of cards. Further, the method of shaking the dice may be customized or selection tiles as with Dominos or Scrabble, tiles on area of Gameboard 50 display screen face down, player can chose the random computer pic or touch the tiles displayed to make their choice. When playing games like Scrabble where it's beneficial to have game boards facing you, on the Gameboard 50 the screen display will rotate to face next player, all options of play will be set up by players.

Other features of the present invention include score displays may be available on the Gameboard 50 and Interactive Devices 60, 62. A hand held device is used when players need to keep user specific cards, tiles, game pieces hidden from other players, a hand held device may be sold with Gameboard and or separately, players will also be able to use their smartphone or iPad as their hand held device. Not only can they link their phone or tablet to Gameboard but each Gameboard will be able to link to each other, one way will be by Internet so even if out of state, two or more Gameboards can link to each other to allow players to play the same game. In another way Gameboards will link to each other for tournament style games, for large family get togethers, events, fund raising, for any reason. Again, players will set up the tournament rules, time limits, play for each tournament as they want and Gameboard does the rest, keeps scores, time, breaks, and moves players around when called for. Gameboard also lets you pause any game and resume later, can keep tract of statistics for all players.

The All in One Gameboard be used for educational purposes, with the larger screen, touch screen feature, hand held devices will make it beneficial for at home schooling as well as in schools. Being able to adjust Gameboard from laying flat on surface to adjust screen to an angle for arcade style games, better view for educational, the Gameboard has all features needed for whatever game or puzzle you want to play, how you play, how you score, how you display, how you view. The Gameboard can also be used to draw on with electronic pen, just as you can now draw and create on your personal devices, the bigger screen on the Gameboard will allow you to split screen for more than one person to use to draw, color and create on, their pens only working on their side or all areas, again allowing users of the Gameboard to decide how they want to use it.

Additional features of the present invention include the ability to draw and create art by using a pen with multiple sized points as well as a brush which can be adjusted for different brush strokes, the color chart to select what color to use along with the capability to select multiple colors to use at same time-beneficial for the painting. Being able to add a picture of anything to draw around to create your own art, such as digital photos of yourself, friends and family, inserting the selected photo onto your drawing screen and then being able to draw or paint. A user can also save their artwork as well as send via email to friends and family. This feature may be beneficial for home schooling in order to teach various subjects such as geography, where a map of the United States shows on the screen, and a student may then write in the state and/or capitol into the appropriate state on map. Math may be another subject taught on the present invention, where a math problem may be displayed on the screen, and a student may fill in the appropriate answer. The desired configuration may be displayed by the user as desired and in some cases, a teacher may determine appropriate educational engagement based on the homework.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The exemplary embodiment was chosen and described in order to best explain the principles of the invention and its practical application, to thereby enable others skilled in the art to best utilize the invention and various embodiments with various modifications as are suited to the particular use contemplated.

What is claimed is:

1. An electronic table top game board comprising:
    a. an interface area, where the interface area adapts to a predetermined configuration based on user input, where the interface area is adaptable between a flat and tilted position and said interface area includes a split screen feature;
    b. player informational displays surrounding the interface area; and
    c. a plurality of user interactive devices, wherein each of the said plurality of user interactive devices are hand held and include an interactive display.

2. The electronic table top game board according to claim 1, where the interface area includes touch interactive protocol.

3. The electronic table top game board according to claim 1, where the plurality of user interactive devices includes touch interactive protocol.

4. The electronic table top game board according to claim 1, further including an alternative controller, where the alternative controller includes a joystick and a plurality of control buttons.

5. The electronic table top game board according to claim 1, where the plurality of user interactive devices include smartphones.

6. The electronic table top game board according to claim 1, where the interactive display displays a card game and the interactive devices are synced with the interactive display to enable play.

7. The electronic table top game board according to claim 1, where the interactive display displays an educational engagement platform.

8. The electronic table top game board according to claim 7, where the educational engagement platform may be user controlled or instructor controlled for engagement.

9. The electronic table top game board according to claim 1, where the interactive display includes an artistic engagement enabling the user to draw and create art.

10. The electronic table top game board according to claim 1, where the interactive display is enabled for tournament play.

* * * * *